3,243,381
ALKALINE EARTH HALIDE DIVALENT DYSPROSIUM LASER MATERIALS
Perry N. Yocom, Princeton, N.J., Michael Kestigian, Stow, Mass., and George J. Goldsmith, Princeton, N.J., assignors to the United States of America as represented by the Secretary of the Air Force
No Drawing. Filed June 13, 1963, Ser. No. 287,727
11 Claims. (Cl. 252—301.4)

This invention relates to dysprosium used as a laser material.

This invention is a further development of the teachings and disclosures in the previously applied for application for patent by Perry N. Yocom on Luminescent Materials, Serial No. 182,672 filed March 26, 1962, now United States Patent No. 3,163,610 and Serial No. 185,530 filed April 6, 1962, now United States Patent No. 3,163,608 that apply hereto and that may be regarded as being parts hereof for definitions, porcedures, and the like.

The object of the present invention is to present dysprosium as a laser material.

Further objects of the present invention are the production of alkaline earth halide compounds that are doped with divalent dysprosium.

The materials are produced by reacting a chosen molten alkaline earth halide containing trivalent dysprosium with metallic dysprosium or by gamma irradiation of the solid alkaline earth halide containing trivalent dysprosium.

The resulting product is used as a laser material which produces a coherent beam of infrared light when excited by radiant energy.

This composition has the molar composition AHaF:yM. In this relation A is at least one of the alkaline earth metals in the group that consists of Ba, Ca and Sr. Ha is at least one of the halides in the group that consists of Br, Cl and I. F is fluorine. M is the metal dysprosium, or Dy. $y$ is between $10^{-6}$ and $10^{-1}$ mol.

When excited by suitable radiant energy, the composition is caused to luminesce, emitting radiation in a relatively narrow band of wavelengths of light in the infrared region of the spectrum. This luminescence occurs with the material at room temperature and at the temperature of liquid nitrogen. The melting point of nitrogen is $-209.86°$ C., and the boiling point of nitrogen is $-195.8°$ C. Nitrogen is in its liquid state between these two temperatures. The wavelength range of the emitted radiation is due to the dysprosium that is used to dope the particular alkaline earth halide that is under observation. In general, the emission band is shifted toward the shorter wavelength, when the alkaline earth metals and the halogens of higher molecular weights are selected.

When the materials under experimentation are made in single crystal form with high purity and crystallinity, at least some of the crystals can be made to lase with radiant excitation, such as with visible or ultraviolet excitation that causes the material to luminesce.

The luminescent materials of the present invention are prepared by fusing together a selected pure anhydrous constituent halide in an atmosphere that is conductive to developing the desired valency in the element that dopes the crystal, or the dopant.

Typically one mol of a selected pure anhydrous alkaline earth metal halide, one mol of anhydrous pure alkaline earth metal fluoride, and a desired mol proportion of dysprosium halide or dysprosium fluoride are fused together in a reducing atmosphere, such as in an atmosphere of hydrogen; or in a neutral atmosphere, such as in an atmosphere of nitrogen, argon, or neon, or a combination thereof.

The dysprosium dopant is introduced as dysprosium oxide, providing the atmosphere also contains the corresponding hydrogen halide. $CaF_2:Dy^{+2}$ is an illustrative commercial product. The melt is solidified by being cooled to room temperature in the hydrogen halide protective atmosphere. The alkaline earth halide and the alkaline earth fluoride may be combinations of two or more different halides.

The alkaline earth halogen, the alkaline earth fluoride, the dysprosium halogen and the dysprosium fluoride, are preferably substantially free of carbonaceous material, free water, and chemically combined water, oxides, and the like. Some reagent grade raw materials satisfy these requirements and some do not.

The luminescent materials of the present invention are prepared as relatively large, single crystals with a high degree of crystallinity. This is achieved by melting the luminescent materials of the invention and growing crystals thereof by the Bridgman technique, either horizontal or vertical. In one application of the Bridgman technique, a quantity of material is passed through two zones, one of which is maintained about 20° C. above the melting point of the material and the other of which is maintained at a temperature that is about 20° C. below the melting point of the material. A rate of travel of about one inch per 24 hours may be taken as being illustrative. Large single crystals may also be grown by the Czochralski method.

What is claimed is:
1. A laser material having the molar composition: AHaF:yM where A is at least one of the group that consists of Ba, Ca and Sr; Ha is at least one of the group that consists of Br, Cl and I; F is fluorine; M is dysprosium; and $y$ is between $10^{-6}$ and $10^{-1}$ mol.
2. A laser material having the molar composition: AHaF:yM where A is Ba; Ha is at least one of the group that consists of Br, Cl and I; F is fluorine; M is dysprosium; and $y$ is between $10^{-6}$ and $10^{-1}$ mol.
3. A laser material having the molar composition: AHaF:yM where A is Ca; Ha is at least one of the group that consists of Br, Cl and I; F is fluorine; M is dysprosium and $y$ is between $10^{-6}$ and $10^{-1}$ mol.
4. A laser material having the molar composition: AHaF:yM where A is Sr; Ha is at least one of the group that consists of Br, Cl and I; F is fluorine; M is dysprosium; and $y$ is between $10^{-6}$ and $10^{-1}$ mol.
5. A laser material having the molar composition: AHaF:yM where A is Ba; Ha is Cl; F is fluorine; M is dysprosium; and $y$ is between $10^{-6}$ and $10^{-1}$ mol.
6. A laser material having the molar composition: AHaF:yM where A is Ca; Ha is Br; F is fluorine; M is dysprosium; and $y$ is between $10^{-6}$ and $10^{-1}$ mol.
7. A laser material having the molar composition: AHaF:yM where A is Sr; Ha is I; F is fluorine; M is dysprosium; and $y$ is between $10^{-6}$ and $10^{-1}$ mol.
8. The process of making the molar composition material AHaF:yM wherein A is at least one of the alkaline earth metals selected from the group that consists of Ba, Ca and Sr; Ha is at least one of the halides that is selected from the group that consists of Br, Cl and I; F is fluorine; M is the metal dysprosium; and $y$ is between $10^{-6}$ and $10^{-1}$ mol; which process comprises mixing the selected alkaline earth metal halide with a selected alkaline earth metal fluoride and trivalent dysprosium in the designated molar proportions; position- ing the mix within an enclosure under a controlled atmosphere; and fusing the mix.

9. The process defined by claim 8 wherein the fusion is conducted in a neutral atmosphere.

10. The process defined by claim 8 wherein the fusion is conducted in a reducing atmosphere.

11. The process of claim 8 wherein the fused mix is cooled in the controlled atmosphere.

References Cited by the Examiner
UNITED STATES PATENTS
3,130,254  4/1964  Sorokin et al. _____ 252—301.4

OTHER REFERENCES

Johnson: "Optical Maser Characteristics of Rare-Earth Ions in Crystals," Journal of Applied Physics, vol. 34, No. 4, part I, April 1963, pages 897–907.

Yariv: "Continuous Operation of a $CaF_2:Dy^{2+}$ Optical Maser," Proc. IRE, July 1962, vol. 50, No. 7, pages 1699–1700.

TOBIAS E. LEVOW, *Primary Examiner.*

MAURICE A. BRINDISI, *Examiner.*

R. E. EDMONDS, *Assistant Examiner.*